US008028937B2

(12) United States Patent
Gründl et al.

(10) Patent No.: US 8,028,937 B2
(45) Date of Patent: Oct. 4, 2011

(54) FUEL INJECTION VALVE

(75) Inventors: Andreas Gründl, München (DE); Bernhard Hoffmann, Starnberg (DE)

(73) Assignee: Compact Dynamics GmbH, Starnberg (DE)

( * ) Notice: Subject to any disclaimer, the term of this patent is extended or adjusted under 35 U.S.C. 154(b) by 858 days.

(21) Appl. No.: 11/571,486

(22) PCT Filed: Jul. 1, 2005

(86) PCT No.: PCT/EP2005/007130
§ 371 (c)(1),
(2), (4) Date: Dec. 29, 2006

(87) PCT Pub. No.: WO2006/002953
PCT Pub. Date: Jan. 12, 2006

(65) Prior Publication Data

US 2008/0092854 A1 Apr. 24, 2008

(30) Foreign Application Priority Data

Jul. 2, 2004 (DE) ......................... 10 2004 032 229

(51) Int. Cl.
*B05B 1/30* (2006.01)
*F16K 31/02* (2006.01)
*F02M 51/00* (2006.01)

(52) U.S. Cl. ............. 239/585.1; 239/585.5; 251/129.09; 251/129.16

(58) Field of Classification Search .................... 239/88, 239/585.1–585.5, 89–92; 123/476; 251/129.15, 251/129.09, 129.16; 335/266, 268, 299
See application file for complete search history.

(56) References Cited

U.S. PATENT DOCUMENTS 4,156,506 A * 5/1979 Locke et al. ............... 239/585.3
4,390,856 A 6/1983 Schechter
4,708,317 A * 11/1987 Hiyama .................. 251/129.16
5,035,360 A * 7/1991 Green et al. ............... 239/585.3
5,207,410 A * 5/1993 Wakeman ................ 251/129.15
6,065,684 A * 5/2000 Varble et al. ....................... 239/5
6,155,503 A * 12/2000 Benson et al. ............. 239/585.1
6,651,913 B1 * 11/2003 Greif .......................... 239/585.1
6,892,971 B2 * 5/2005 Rieger et al. ............... 239/585.1
7,533,834 B2 * 5/2009 Grundl et al. ............. 239/585.5

(Continued)

FOREIGN PATENT DOCUMENTS

DE 2237746.4 8/1972

(Continued)

*Primary Examiner* — Jason Boeckmann
*Assistant Examiner* — Steven M Cernoch
(74) *Attorney, Agent, or Firm* — Hiscock & Barclay, LLP

(57) ABSTRACT

A fuel injection valve for fuel injection systems of internal combustion engines, in particular for injecting fuel directly into a combustion chamber of an internal combustion engine, said fuel injection valve comprising a fuel inlet which is designed to allow fuel to flow into the fuel injection valve, and an actuating device which can be electrically activated and cooperates with a valve arrangement in order to discharge fuel into the combustion chamber in a directly or indirectly controlled manner via a fuel outlet the actuating device having a solenoid arrangement which is to be energized, a substantially magnetically soft magnet yoke arrangement which cooperates therewith, and a substantially magnetically soft magnet armature arrangement which cooperates therewith. The magnet yoke arrangement is constituted by at least two yoke discs. At least one of the faces of each yoke disc has at least one pole web which together with the solenoid arrangement acts upon the magnet armature arrangement. Each yoke disc is composed of at least two partial yokes which contain soft iron and at least partly surround an actuating rod which supports the magnet armature arrangement.

26 Claims, 7 Drawing Sheets

U.S. PATENT DOCUMENTS

| | | | | |
|---|---|---|---|---|
| 2001/0019085 | A1* | 9/2001 | Okajima et al. | 239/585.1 |
| 2003/0116657 | A1 | 6/2003 | Nakayama et al. | |
| 2003/0122000 | A1* | 7/2003 | Dressler et al. | 239/585.1 |
| 2004/0118952 | A1* | 6/2004 | Nussio | 239/585.1 |

FOREIGN PATENT DOCUMENTS

| | | | | |
|---|---|---|---|---|
| DE | 100 05 182 | A1 | | 2/2000 |
| DE | 10005180 | C1 | * | 8/2001 |
| DE | 102 60 825 | | | 7/2003 |
| JP | 10-335139 | | | 5/1997 |
| JP | 10335139 | A | * | 12/1998 |
| WO | WO 2004/097207 | A1 | | 11/2004 |
| WO | WO 2004097207 | A1 | * | 11/2004 |

* cited by examiner

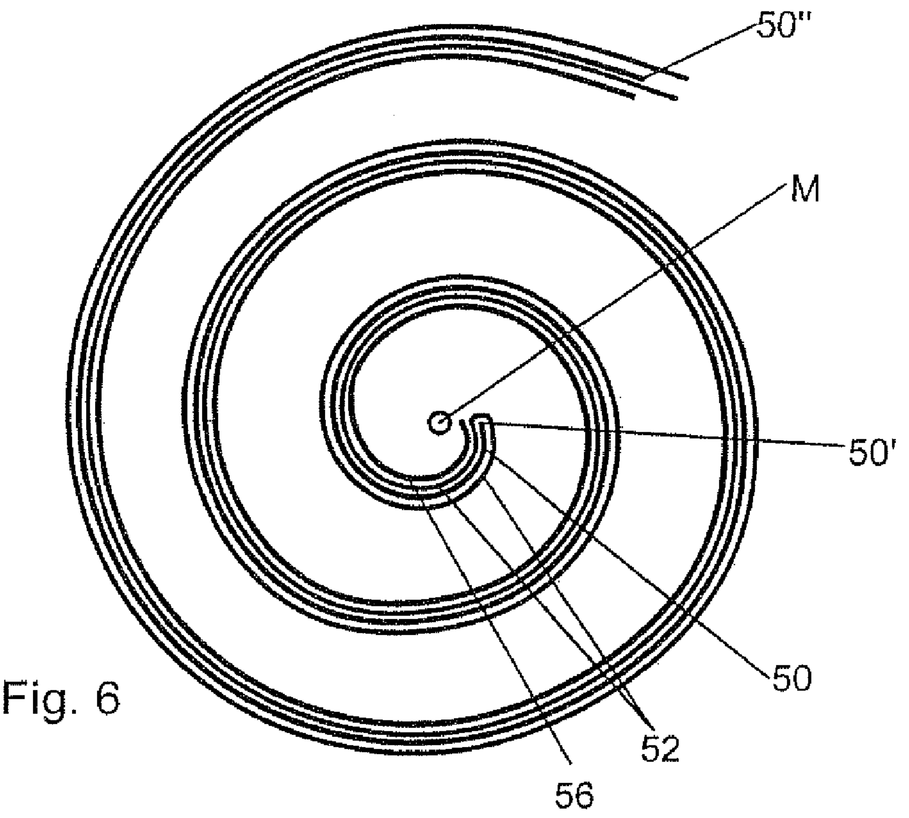
Fig. 6
Fig. 7
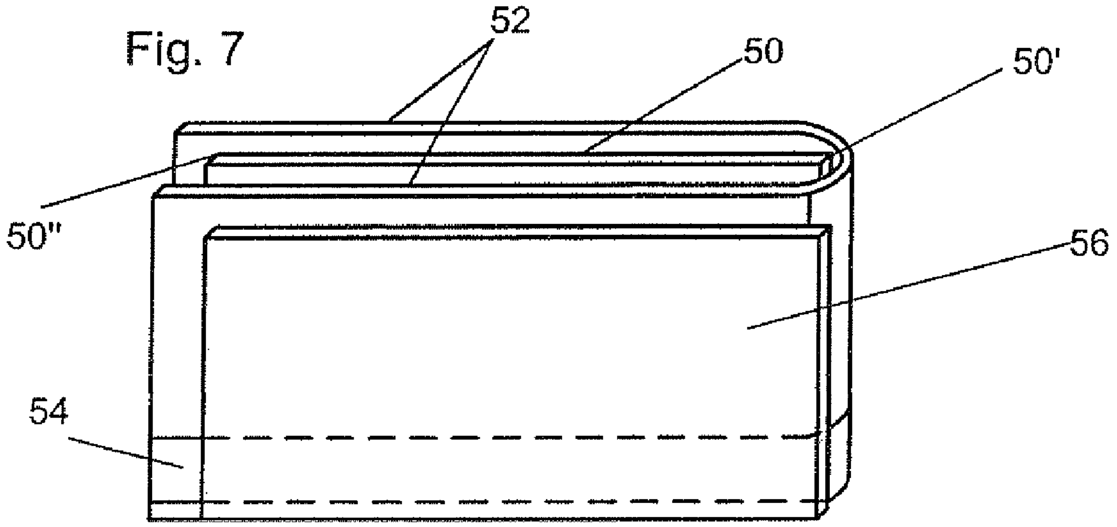

FUEL INJECTION VALVE

BACKGROUND OF THE INVENTION

The invention relates to a fuel injection valve for fuel injection systems of internal combustion engines, in particular for injecting fuel directly into a combustion chamber of an internal combustion engine. Basically, it is possible for the invention to be used both in the case of directly injecting engines and in the case of conventional engines that inject into the induction pipe.

The fuel injection valve according to the invention has a fuel inlet which is designed to allow fuel to flow into the fuel injection valve, and an actuating device which can be electrically activated and cooperates with a valve arrangement in order to discharge fuel into the combustion chamber in a directly or indirectly controlled manner via a fuel outlet. The electromagnetic actuating device in this case has a solenoid arrangement which is to be energized, a substantially magnetically soft magnet yoke arrangement which cooperates therewith, and a substantially magnetically soft magnet armature arrangement which cooperates therewith.

Owing to the continually growing demands of the legislation on exhaust emissions, with limiting values being reduced further, the motor-vehicle internal combustion engine industry is facing the challenge of optimizing the operation of injecting fuel into the combustion chamber in order to optimize the formation of pollutants at their place of origin. Particularly critical are emissions of $NO_x$ and particulates. Although it is possible to maintain current limiting values through the development of injection systems with ever higher injection pressures and highly dynamic injectors, and by means of cooled exhaust-gas recirculation and oxidizing converters, it nevertheless appears that the existing measures for reducing emissions have attained their potential. Consequently, variable injection pattern formations are coming to the fore. In this case, the fuel injection rate is varied, either by multiple injection or by selective modulation of the stroke of the Jet needle.

PRIOR ART

A fuel injection valve of the above-mentioned type is known in a great variety of embodiments by a plurality of manufacturers (Robert Bosch, Siemens VDO Automotive). Inherent in these known arrangements, however, is the disadvantage that the number of strokes per work cycle of the internal combustion engine is very limited. In particular, with these arrangements it is not possible, in the case of high-speed internal combustion engines, to provide the required number of multiple injections per work cycle that are necessary for efficient engine management. In addition, in the case of these arrangements the precise variation of the stroke of the valve needle is possible only to a very limited extent. In both respects, the conventional electromagnetic actuating devices have been found to be a limiting factor for the further development of efficient fuel injection valves.

A known approach for overcoming this limitation consists in the provision of a piezo-linear actuator instead of the electromagnetic actuating device, Apart from the high costs and the relatively large structural space required by the piezo-linear actuator, its temperature-dependent behaviour, in immediate proximity to the combustion chamber of an internal combustion engine, is also disadvantageous. In addition, piezo drives of current design allow only about 3 to 5 injection operations per work cycle of the internal combustion engine, with opening/closing cycles of about 100 µsec being achievable. Overall, a relatively large-scale use of this type of fuel injection valve in production vehicles has been rejected hitherto. In addition, the stroke travel of a piezo-linear actuator is very limited for a given overall length, and is currently increased to approximately 100 to 200 µm by means of complex lever arrangements. Finally, the precise modulation of the stroke of the jet needle by means of the piezo-linear actuator continues to prove difficult in the case of the high dynamic response and the increasingly high pressures in the combustion chamber, particularly in the case of diesel direct injection.

DE 100 05 182 A1 discloses an electromagnetic injection valve for controlling a quantity of fuel to be fed into an internal combustion engine, said valve comprising a valve body which can be actuated by a solenoid system, the valve body cooperating with a magnet armature of the solenoid system. The essential feature of this arrangement consists in that the solenoid system has at least two coils, having identical characteristic values, which are disposed symmetrically and concentrically in relation to the central longitudinal axis, and which are integrated into a magnetic circuit in such a way that a respective first pole body is disposed between two adjacent coils, and the inner and the outer coil are adjacent to a respective second pole body. These pole bodies are disposed on the same side of the magnet armature. It is furthermore essential that the pole bodies are dimensioned in such a way that a radial sectional area of a middle first pole body corresponds to the sum of the sectional areas of the adjacent second pole bodies. Overall, in the case of this arrangement, its functioning depends substantially on the symmetry of the spatial design of the solenoid system. The time delay of the build-up of the electric and magnetic fields in this case depends chiefly on the geometry of the magnetic circuit and, in particular, on the field diffusion and the occurring eddy currents.

However, the structural and electrical/magnetic symmetry of the solenoid system that is necessary in the case of this arrangement, for example the dimensioning or the ratio of the radial sectional areas of the pole bodies relative to one another, constitutes a substantial limitation. Moreover, in the case of this known arrangement, likewise, the valve switching times, valve travels and valve closing forces that can be achieved must be described as unsatisfactory, at best, in view of the requirements explained at the beginning.

DE 102 60 825 A1 discloses a magnetically actuated fuel injection valve in which an aperture cross-section of a fuel channel, which is inserted into the fuel as a space between the inner face of a container and an outer face of a needle element disposed in the container, is varied, For this purpose, the needle element is displaced in the longitudinal direction by attractive or magnetic forces generated by an electromagnetic device. The electromagnetic device is provided with a first and a second magnetic circuit, through which the attractive or magnetic forces can be controlled independently of one another.

Further prior art is disclosed by the documents U.S. Pat. Nos. 6,065,684, 5,035,360, 4,156,506, 5,207,410, JP 10-335139, DE 2237 746.4 and US 2001/0019085.

Problem on Which the Invention Is Based

In the case of known fuel injection valves, therefore, there is the problem of providing a compactly constructed, inexpensive arrangement of a fuel injection valve which has long-term strength and is suitable for use in large production lots, and is capable of executing, with the necessary opening/closing forces, a sufficiently high number of strokes per work cycle of the internal combustion engine. The aim of the present invention is to provide fuel injection valves which can contribute towards reducing the fuel consumption of internal combustion engines, in order thereby to increase the thermodynamic efficiency of the internal combustion engine.

Solution According to the Invention

The invention solves this problem, in the case of a valve arrangement of the above-mentioned type, in that the magnet yoke arrangement is constituted by at least two yoke discs, at least one of the faces of each yoke disc has at least one pole web which together with the solenoid arrangement acts upon the magnet armature arrangement, and each yoke disc is composed of at least two partial yokes which contain soft iron and at least partly surround an actuating rod which supports the magnet armature arrangement.

This is because it has been shown, surprisingly, that it is not necessary to convert from an electromagnetic actuating device, as a valve drive, to a piezo-linear actuator, with all its inherent disadvantages and problems Rather, if the components of the electromagnetic actuating device are designed according to the invention, it is possible to achieve a situation whereby the fuel injection valve, by means of the electromagnetic actuating device, can provide not only the opening/closing forces that are necessary for petrol engines, but even the opening/closing forces necessary for a direct injection of diesel, with substantially more strokes per work cycle (approximately twice as many as a piezo-linear actuator of current design). Furthermore, the overall arrangement is of a very compact structure, with the ability to rapidly provide high opening/closing forces with a small diameter outer diameter. The design according to the invention also allows very efficient mass production with small tolerances and a low reject rate.

The valve arrangement according to the invention allows the realization of opening/closing cycles at approximately 40-50 μsec and less. Multiple injection operations are thus possible for efficient engine management of both petrol engines and diesel engines. In addition, it is also possible for the throughput of fuel through the fuel injection valve to be increased in that, by means of the valve arrangement according to the invention, the stroke travel of the valve element can be approximately 3 to 6 times greater, for a comparable stroke time, than in the case of a piezo-linear actuator of current design. Furthermore, the arrangement according to the invention allows very precise control of the course of the stroke travel over time. The prior art (for example, from DE 100 05 182 A1), requires a centrosymmetrical geometry of the pole webs. In this case, the outer iron rings also have a smaller cross-section than the inner rings. This adversely affects the design of the magnet armature. By contrast, the invention provides in this respect for a lack of constraint in the dimensioning of the magnet yoke, solenoid arrangement and magnet armature arrangement, resulting in the case of the invention in, for example, a magnet armature of relatively lighter weight with improved valve dynamics.

Enhancements and Developments of the Invention

In a preferred embodiment of the invention, each partial yoke cooperates with at least one spacer which at least concomitantly determines a dimension of a cavity between two yoke discs. The spacer or spacers may either be disposed in the region of the outer circumferential surface of the yoke disc or be supported between the faces of two yoke discs. The spacers are either (laser-) welded or bonded to the partial yokes or yoke discs. Alternatively, the spacers may also be realized such that, at least at one end, they are integral with the partial yokes or yoke discs.

Furthermore, electrical connections for the solenoid arrangement may be disposed or routed in the region of the outer circumferential surface of the yoke disc. This enables the individual windings of the solenoid arrangement to be energized in a simple manner.

Preferably, solenoid arrangements facing respectively the same side of the magnet armature arrangements are connected for co-phasal electrical activation in series or parallel connection. It is thereby possible to open, close or hold the valve arrangement by electrical actuation, without the need for a retaining spring. A retaining spring in this case is understood to be a spring, having a high spring constant, which is able to hold the valve arrangement in a position against the operating pressures (of the supplied fuel and in the combustion chamber). To be distinguished from said spring is a spring which, when the valve arrangement is not energized and in the absence of operating pressures, is able to cause the valve element to remain in a closed position, such that no fuel flows through the valve arrangement into the fuel chamber.

The invention allows the valve arrangement both to be opened by electrical actuation and to be closed by electrical actuation, and to be held in both positions—but also in intermediate positions,—in that the respective coil arrangement of the coil arrangements disposed on both sides of the armature arrangement is energized. Braking or acceleration of the valve element on the path between the two end positions can also be achieved in this way. Consequently, the valve element can be conveyed in a considerably "softer" manner into the valve seat or into the opposite end position. This results in a lesser mechanical loading of the valve element or valve seat, such that these components do not wear so rapidly. This allows a less robust dimensioning and a smaller diameter of the jet needle, and consequently a reduction of the closing/holding forces required. Consequently, a more precise metering of the fuel is possible, as is a higher movement rate, with more opening/closing cycles per work cycle than in the case of piezo actuators, owing to the lesser moved masses, In addition, the force/travel behaviour of a piezo actuator is considerably less favourable and less able to be influenced than in the case of an actuating device according to the invention.

In the case of a first development of the fuel injection valve according to the invention, the pole webs have a grid dimension which is approximately 2 to approximately 30 times, preferably approximately 5 to approximately 20 times, and in particular preferably approximately 10 times greater than an air gap that is formed between the magnet yoke arrangement and the magnet armature arrangement when the actuating device is in its neutral position. The ratio between the grid dimension of the pole webs, i.e. a dimension which concomitantly determines the magnetically effective surface area of the pole webs, and the air gap is a quantity which considerably influences the functionality of the valve. The invention proceeds from the principle that the ratio should be in the region between approximately 2 and approximately 30, each ratio number between these limits being within the scope of the invention and being dependent, primarily, on the design conditions or requirements (available mounting diameter, length, required valve stroke, valve element dynamics, etc.).

The fact that the pole webs are of a shape which is substantially asymmetrical in relation to the central longitudinal axis of the fuel injection valve prevents production inaccuracies or fluctuations in the generation of the magnetic field or temperature fluctuations from resulting in undesirable operating states. Rather, the design of the magnet yoke or magnet coil, being non-rotationally symmetrical in relation to the central longitudinal axis, is characterized as substantially non-sensitive in these respects.

For this purpose, in an embodiment of the invention, the pole webs are of a spiral shape in relation to the central longitudinal axis of the fuel injection valve. In another embodiment of the invention, the pole webs are of a substantially polygonal, preferably quadrangular or multi-edged shape, and are disposed next to one another so as to form intermediate spaces for accommodating the solenoid arrangements, the pole webs preferably being disposed in parallel to one another.

In the latter case, at least two adjacent pole webs may be at least partially surrounded in the form of a meander by at least one solenoid arrangement. Alternatively, each partial yoke may also respectively be made of a cobalt-iron-containing material and have at least one respective pole web, which is at least partly surrounded by at least one solenoid arrangement.

A feature of the invention is that at least one solenoid arrangement may at least partly enclose pole webs of non-circular shape. This design, which can be produced very efficiently, renders possible an embodiment in which a current-carrying band for constituting the solenoid arrangement, and a plate band containing soft iron for constituting a stator yoke back, are disposed between two layers of plate containing soft iron. In this case, the current-carrying band and the plate band containing the soft iron adjoin each other—in an electrically insulated manner—at a respective longitudinal edge.

In order to achieve particularly slender or elongated structural forms with large holding or closing forces, provision is made for a cascade of a plurality of valve drives along the axis of motion of the valve arrangement, in which cascade the actuating device has more than one assembly, constituted by the solenoid arrangement, the magnet yoke arrangement and the magnet armature arrangement. These assemblies in this case act jointly upon the valve arrangement—either in the same direction or in opposite directions—in order to raise the valve element out of the valve seat or to convey it into same, said valve element possibly also being braked.

According to the invention, the actuating device acts upon a movable valve element in order to move said valve element, in relation to a stationary valve seat which cooperates with the valve element and is disposed downstream from the fuel inlet, between an open position and a closed position. This permits the realization of a directly switching valve arrangement.

In the case of another development of the fuel injection valve according to the invention, the actuating device acts upon a movable valve element in order to move said valve element, in relation to a stationary valve seat which cooperates with the valve element, between an open position and a closed position This renders possible a controlled discharge of fuel into a return line when a second, spring-loaded valve element, together with a second valve seat, is not opened by the pressure prevailing in the combustion chamber, and renders possible a controlled discharge of fuel into the combustion chamber when the second, spring-loaded valve element, together with the second valve seat, is opened by the pressure prevailing in the combustion chamber. This permits the realization of an indirectly switching valve arrangement.

According to the invention, the magnet yoke arrangement and/or the magnet armature arrangement may be disposed eccentrically or asymmetrically in relation to a central axis of the fuel injection valve.

In a preferred embodiment, the magnetically soft magnet yoke arrangement may be constituted by at least two conjoined shell parts with recesses, each recess accommodating a respective solenoid arrangement which ends substantially flush with the respective end face of one of the shell parts in the direction of motion, the end faces together delimiting a cavity in which the magnet armature arrangement is accommodated so as to be movable along the central longitudinal axis.

The solenoid arrangement may be constituted, on at least one side of the magnetically soft magnet armature arrangement, by a solenoid arrangement having a plurality of coils which end approximately flush with one of the end faces of one of the shell halves.

In this case, the individual ring coils may be of a thickness of approximately 20 to approximately 80% of the magnet yoke iron. In addition, the individual coils may be arranged, on one side of the magnetically soft magnet armature arrangement, to be energized in opposite directions.

Furthermore, between the individual coils, at least on one side of the magnetically soft magnet armature arrangement, the yoke iron may be constituted by iron plates which are insulated from each other.

The invention is based on the principle of orienting the solenoid arrangement and the magnet armature arrangement substantially orthogonally in relation to each other.

According to the invention, the solenoid arrangement and the magnet armature arrangement may overlap at least partly, preferably completely, in the radial direction in relation to the central longitudinal axis. There is thereby realized a particularly efficient magnetic circuit which allows very short valve opening/closing times.

In the case of an embodiment of the fuel injection valve according to the invention, the magnet yoke arrangement may be designed as a substantially cylindrical, magnetically soft disc body with openings which are oriented radially or tangentially in relation to the central longitudinal axis. These openings may be simple slots or, in order to increase the solidity of the magnet yoke arrangement, they may be made of material which has a higher magnetic resistance than the material of the magnetically soft disc body.

In the case of another embodiment of the fuel injection valve according to the invention, the magnet armature arrangement may be constituted by two or more strip-type, magnetically soft portions which are spatially separate from one another. Here, likewise, the spatial separations may be simple slots or, in order to increase the solidity, they may be made of material which has a higher magnetic resistance than the material of the strip-type, magnetically soft portions.

The magnet armature arrangement may be designed as a magnetically soft disc with recesses, preferably radially oriented slots or oblong holes extending to the edge of the disc. Here, likewise, the slots or oblong holes extending to the edge of the disc may be simple recesses or, in order to increase the solidity, they may be made of material which has a higher magnetic resistance than the material of the magnetically soft disc.

The magnet armature arrangement may also be of a multilayer structure, a ceramic layer being disposed between two soft-iron layers. This layer structure is attached to the valve rod. To further improve the solidity, the two iron layers may also additionally be connected to each other along the outer circumference.

Furthermore, the magnetically soft armature arrangement and the valve element may be connected to each other, be biased to the open position or the closed position by a spring arrangement, and be brought into the closed position or the open position as a result of the solenoid arrangement being energized.

According to another embodiment of the fuel injection valve according to the invention, two of the actuating devices described above may also be provided, said actuating devices acting in opposite directions upon the valve element and bringing the latter into the closed position and open position upon their being respectively energized.

According to the invention, the actuating rod, together with magnet armature arrangements disposed, generally (laser-) welded thereon, constitutes a sub-assembly which is to be assembled with at least one further sub-assembly constituted by stacked partial yokes that are held apart.

Furthermore, according to the invention, a pressure-proof housing surrounds the actuating device and the valve arrangement, electrical connections for the solenoid arrangements being routed outwards from said housing by means of glass bushings. For the electrical connections on the fuel injection valve, the glass bushings ensure a secure arrangement which is suitable for large-scale production, is fuel-tight, and is pressure-proof in respect of the operating pressures (up to approximately 2000 bar).

Furthermore, according to the invention, the solenoid arrangements are realized as copper-containing preforms which are electrically insulated by means of ceramic coating, aluminium oxide coating, electrophoretic paint coating or the like; said preforms are mounted around the pole webs and, following joining together of the sub-assembly constituted by individual stacked partial yokes that are held apart, are connected to the electrical connections.

Furthermore, according to the invention, the solenoid arrangements are embedded in or bonded to the partial yokes. This increases the long-term operating strength of the fuel injection valve arrangement.

The fuel injection valve according to the invention may be designed and dimensioned to project into the combustion chamber of an externally ignited internal combustion engine, or into the combustion chamber of a self-igniting internal combustion engine.

Finally, the invention relates to an assembly apparatus, comprising an assembly block which has a number of receptacles which corresponds to the number of yoke discs of the fuel injection valve, said receptacles being axially spaced apart and so dimensioned that the yoke parts of the yoke discs can be inserted and removed in a substantially play-free manner, the axial spacings of the recesses corresponding substantially to the axial extent of the cavity between two adjacent yoke discs, and said assembly block allowing spacers to be welded, soldered or bonded to the yoke parts.

Further advantages, developments or possible variations are disclosed by the following description of the figures, in which the invention is explained in detail.

BRIEF DESCRIPTION OF THE FIGURES

FIG. 6 shows a schematic plan view of a soft-magnet yoke arrangement and of a solenoid arrangement, according to a third embodiment of the invention.

FIG. 7 shows a lateral, perspective representation of the soft-magnet yoke arrangement and of the solenoid arrangement according to FIG. 6.

DETAILED DESCRIPTION OF CURRENTLY PREFERRED EMBODIMENTS

Figure 1:
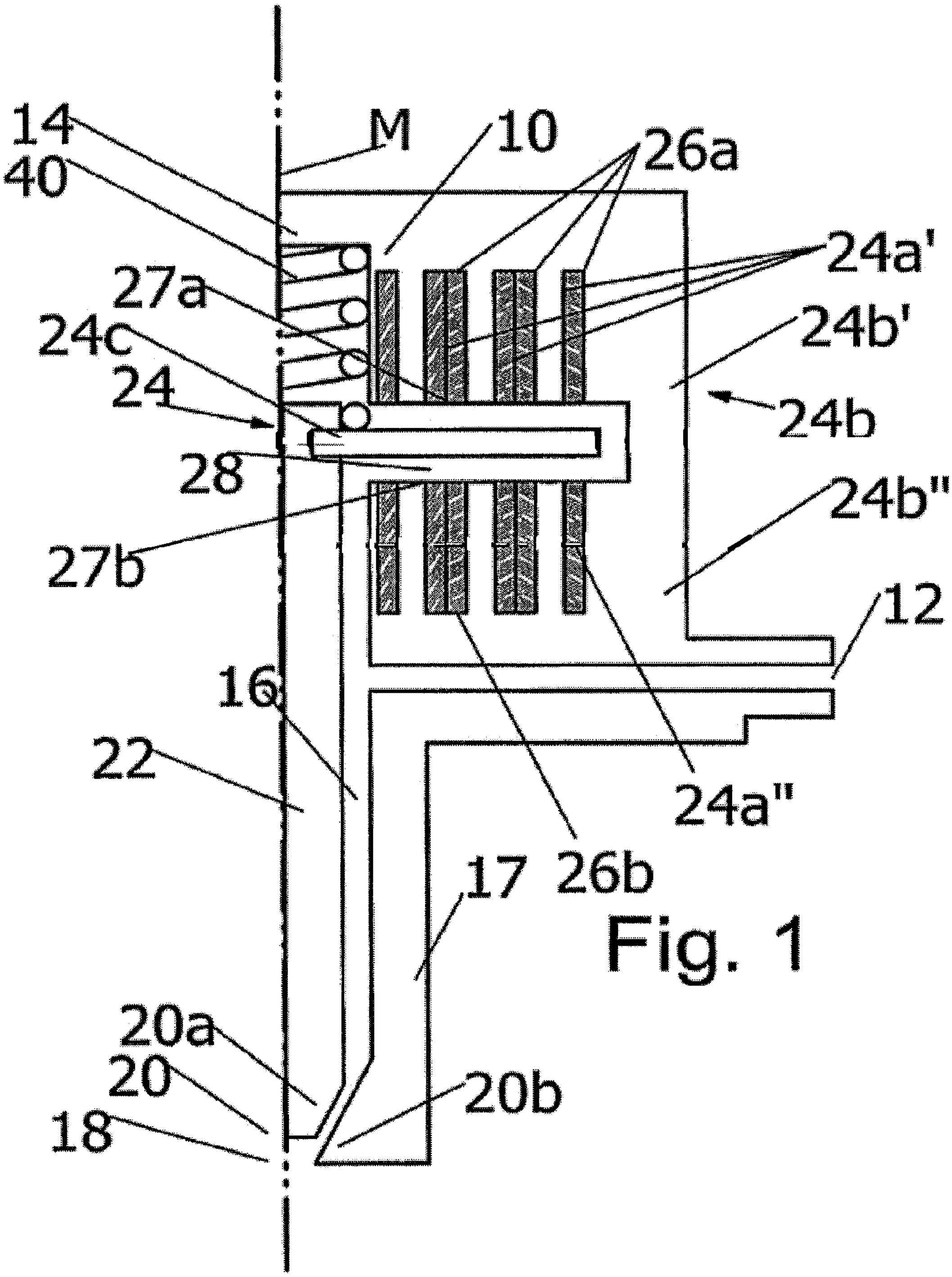
FIG. 1 shows a schematic representation, in longitudinal section, through a fuel injection valve according to a first embodiment of the invention.

In FIG. 1, a fuel injection valve, having a valve housing 10 which is substantially rotationally symmetrical in relation to a central longitudinal axis M, is shown in a schematic longitudinal section, in a half-open position. Such a fuel injection valve serves to inject fuel directly into the combustion chamber, not illustrated further, of an internal combustion engine. The fuel injection valve 10 has a radially oriented lateral fuel inlet 12, through which fuel, pressurized by means of a pump or other pressure generator that is not illustrated further, can flow into the fuel injection valve. It is also possible, however, for the fuel inlet to be provided, for instance, in the region of the fuel injection valve that in FIG. 1 is the central, upper region denoted by 14 From the fuel inlet 12, a central fuel channel 16 extends through a tube 17 to a fuel outlet 18. A valve arrangement 20 is provided at the end of the central fuel channel 16, in order to discharge the fuel into the combustion chamber of the internal combustion engine in a controlled manner via the fuel outlet 18.

The valve arrangement 20 is constituted by a valve element 20*a*, which is provided in the central fuel channel 16 and tapers conically towards the fuel outlet 18, and by a valve seat 20*b* which cooperates with the valve element 20*a* and is shaped to correspond to the form of the valve element 20*a*.

The valve element 20*a* is connected, through an actuating rod 22, to an actuating device 24 which can be electrically activated, in order to move the valve element 20*a* between an open position and a closed position (up and down in FIG. 1). Pressurized fuel, coming from the fuel inlet 12 and flowing through the central fuel channel 16, is thereby ejected through the fuel outlet 18 into the combustion chamber in a controlled manner.

The actuating device 24 is constituted by a solenoid arrangement 24*a*, a magnetically soft magnet yoke arrangement 24*b* which cooperates therewith, and by a magnetically soft magnet armature arrangement 24*c* which cooperates therewith. In this case, the magnetically soft magnet yoke arrangement 24*b* is constituted by two shell halves 24*b'* and 24*b"* which are joined at approximately the level of the line of cut II-II and have recesses 26*a*, 26*b*. In the case of the embodiment according to FIG. 1, in plan view the recesses 26*a*, 26*b* have the longitudinal extent shown in FIGS. 4 and 5, and are delimited by pole webs 25*a*, 25*b* which likewise have the form of a trapezoid or parallelogram. The recesses 26*a*, 26*b* accommodate a respective solenoid arrangement 24*a'* and 24*a"*, which end flush with the respective end faces 27*a*, 27*b* of the shell halves 24*b'* and 24*b"*.

The end faces 27*a*, 27*b* of the shell halves 24*b*′ and 24*b*″ delimit a cavity 28 in which the magnet armature arrangement 24*c* is accommodated so as to be movable along the central axis M.

Figure 4:
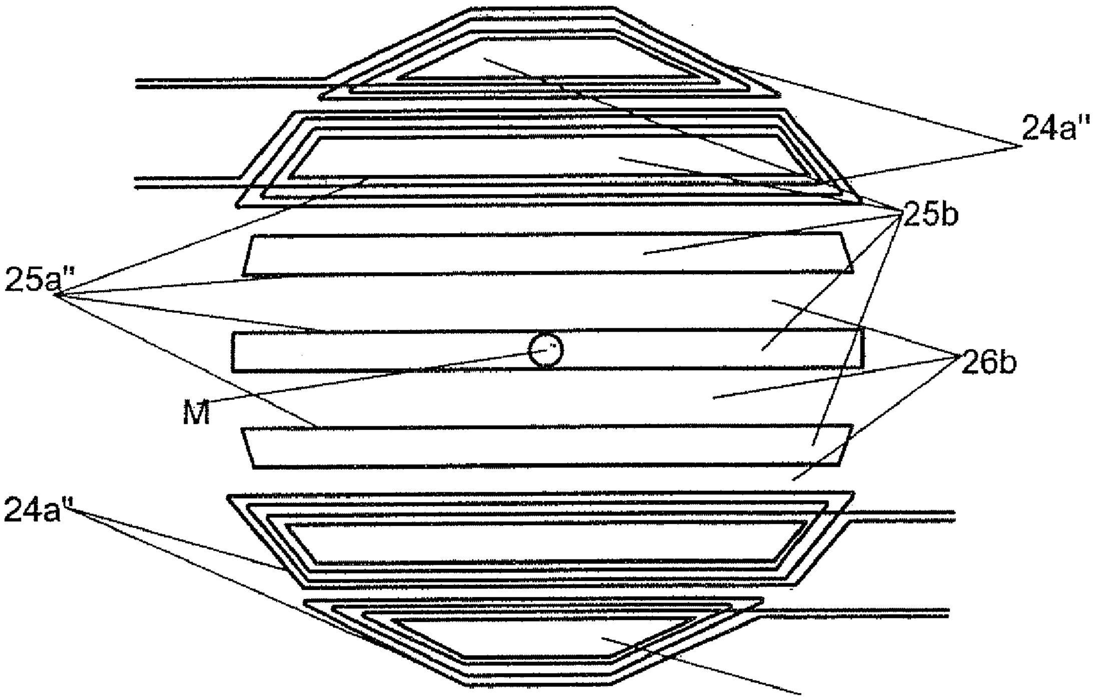
FIG. 4 shows a schematic plan view of a soft-magnet yoke arrangement having a solenoid arrangement.

In the arrangement shown in FIG. 1, the solenoid arrangements and the magnet yoke arrangement have the configuration shown in FIG. 4, in which the pole webs 25*a*, 25*b* are of substantially rectangular shape and are disposed next to one another, so as to form intermediate spaces for accommodating the solenoid arrangements 24*a*′, 24*a*″. In this case, the pole webs 25*a*, 25*b* are preferably disposed in parallel to one to another. The magnet yoke arrangement in this case may be made from single-piece soft iron, from which the pole webs, and the intermediate spaces, are formed. Openings in the form of slots or oblong holes, which are filled with electrically insulating material, can be worked into such a single-piece soft-iron preform. It is also possible, however, for the magnet yoke arrangement to be produced as a preform from sintered iron powder, or to be assembled from a plurality of sub-sections, that are insulated from one another if necessary, and, for example, to be bonded together.

Figure 2:
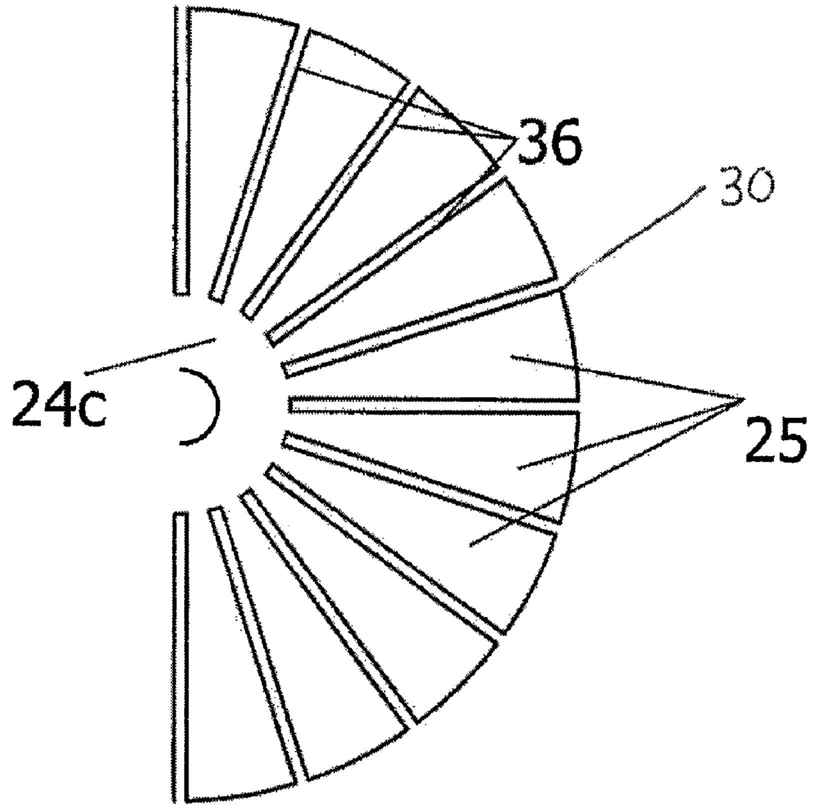
FIG. 2 shows a schematic plan view of a cross-section of a soft-magnet armature arrangement from FIG. 1.

FIG. 2 shows the magnetically soft magnet armature arrangement 24*c*. It has a magnetically soft armature disc 24*c*, which is disposed around the central axis M. In order to keep the eddy currents induced in the armature disc 24*c* as small as possible during operation of the fuel injection valve, the armature disc 24*c* is provided with radially oriented openings 36. These openings have the form of slots 36 extending to the edge 30 of the armature disc 24*c*. There are thereby created radially oriented strips 25, which are connected to one another in the centre of the disc 24*c*.

Figure 3:
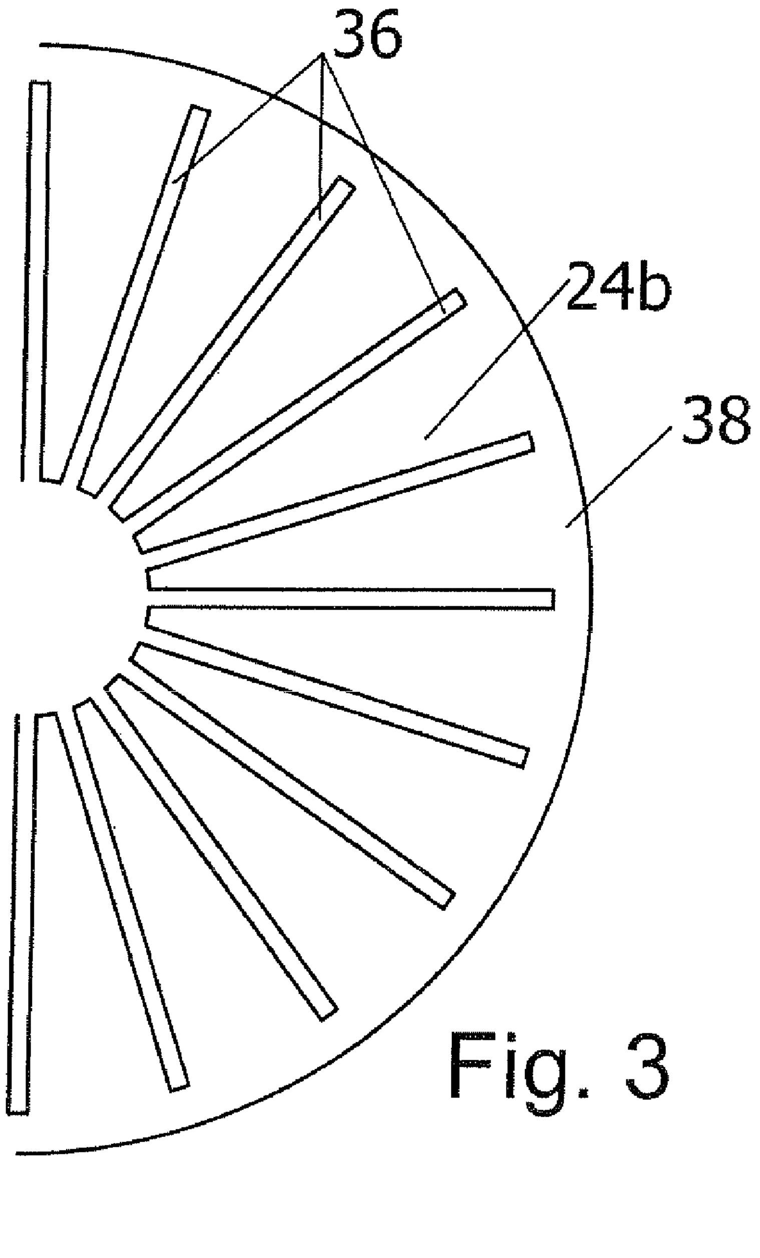
FIG. 3 shows a schematic plan view of a cross-section of a soft-magnet yoke arrangement from FIG. 1.

FIG. 3 shows the magnetically soft magnet yoke arrangement 24*b* in cross-section. In order to keep the eddy currents induced in the magnet yoke arrangement 24*b* as small as possible during operation of the fuel injection valve, the magnet yoke arrangement 24*b* is provided with a multiplicity of radially oriented vertical openings 36 in the form of slots. In order to render the fuel injection valve of a fluid-tight design, a material web 38 is provided at the outer wall, between the slots 36, said material web effecting a closed circumferential surface. Alternatively, the closed circumferential surface may also be disposed at the radially inner ends of the slots 36. This also has the advantage of possibly improving dissipation of heat out of the magnet yoke. In this case, both shell halves 24*b*′ and 24*b*″ of the magnet yoke arrangement 24*b* are provided with the slots 36.

It becomes evident from the above that the solenoid arrangement 24*a* and the radially oriented strips 25 of the magnetically soft armature disc 24*c* may be oriented substantially orthogonally in relation to one another. It is understood that this may be realized either in the form described above, with radially oriented strips 25 of the armature arrangement 24*b* and a spiral-shaped solenoid arrangement 24*a* or magnet yoke arrangement 24*b*, or vice versa. It is also possible, however, for the actuating device 24 to be realized with concentric armature parts and a solenoid arrangement shaped in the form of a star.

The magnet armature arrangement 24*c* is a circular iron-containing disc of a shape described in detail below. The solenoid arrangement 24*a* and the magnet armature arrangement 24*c* overlap in the radial direction in relation to the central axis (M). As shown in FIG. 1, the solenoid arrangement 24*a* has a smaller outer diameter than the armature disc 24*c*, such that the magnetic flux originating from the solenoid arrangement 24*a* enters the armature disc 24*c* virtually without appreciable stray losses. There is thus realized a particularly efficient magnetic circuit, which allows very short valve opening/closing times and high holding forces.

Irrespective of the design of the magnet yoke and solenoid arrangement, the armature disc 24*c* may also be a closed circular disc of soft iron, provided that design of the magnet yoke and solenoid arrangement described above ensures that the stray losses or eddy current losses are small enough for the respective application.

As illustrated in FIG. 1, the armature disc 24*c* is rigidly connected to the actuating rod 22, and accommodated, so as to be moveable longitudinally along the central axis M and guided in the tube 17, in an armature space 34 which is delimited by the shell halves 24*b*′ and 24*b*″ of the magnet yoke arrangement 24*b*. In this case, the armature disc 24*c* with the actuating rod 22 is subjected to load by a helical spring 40 disposed coaxially in relation to the central axis M, such that the valve element 20*a* present at the end of the actuating rod 22 sits in a fluid-tight manner in the valve seat 20*b*, i.e. is forced into its closed position. When one of the coils (for example 24*a*′) of the solenoid arrangement 24*a* is energized, there is induced in the magnet yoke arrangement 24*b* a magnetic field which has a low eddy-current content and draws the armature disc 24*c* with the actuating rod 22 in the direction of the respective shell-half 24*b*′ in which the energized coil is located. The valve element 20*a* thus moves away from the valve seat 20*b*, into its open position. When the other coil (for example 24*a*″) of the solenoid arrangement 24*a* is energized, the valve element 20*a* moves into the respectively other position, towards the valve seat 20*b*, into its closed position. A helical spring 40, which is at the end of the actuating lever 22 distant from the valve element 20*a* and which acts upon said actuating lever, holds the valve element 20*a* in its closed position when the solenoid arrangement 24*a* is not energized.

A development of the invention consists in coupling a plurality of armature discs 24*c* (two or more) to the valve element 20*a* via the actuating rod 22, a coil yoke arrangement acting upon said armature discs from one or both sides in each case. In addition, the coil arrangement 24*a* may in each case be realized in multiple parts on both sides of the magnetically soft magnet armature arrangement 24*c*. In this case, there are respectively provided two or more solenoid arrangements 24*a*′, 24*a*″, which end substantially flush with the respective end faces 27*a*, 27*b* of the shell halves 24*b*′ and 24*b*″. This embodiment can have an increased magnetic field density for an equal structural volume, and thus also have an increased valve-element holding force and valve-element actuating speed. In this case, current directed in opposite directions flows alternately through the individual coils on one side (above or below) of the respective magnet armature arrangement 24*c*. In this case, the yoke iron between the individual coils 24*a* of one side may be constituted by iron plates which are insulated from each other.

The two embodiments are shown with actuating devices 24 which can be electrically activated, in which a central actuating rod 22 is moved by a disc-shaped magnet armature arrangement 24*c*. Instead of the central actuating rod 22, it is also possible to provide a tube, the magnet armature being disposed on its end face. In the case of the embodiment of the magnet yoke and the solenoids according to FIG. 4, each individual pole web is surrounded by a separate winding. To provide a better overview, not all pole webs are shown provided with solenoid arrangements in FIG. 4. In this case, all solenoid arrangements 24*a*′ and 24*a*″ are either wound in opposite directions and energized in the same direction, or are wound in the same direction and energized in opposite directions, in order for respectively oppositely directed electric current to be taken past opposing flanks 25*a*', 25*a*" of the pole webs 25*a*, 25*b*.

Figure 5:
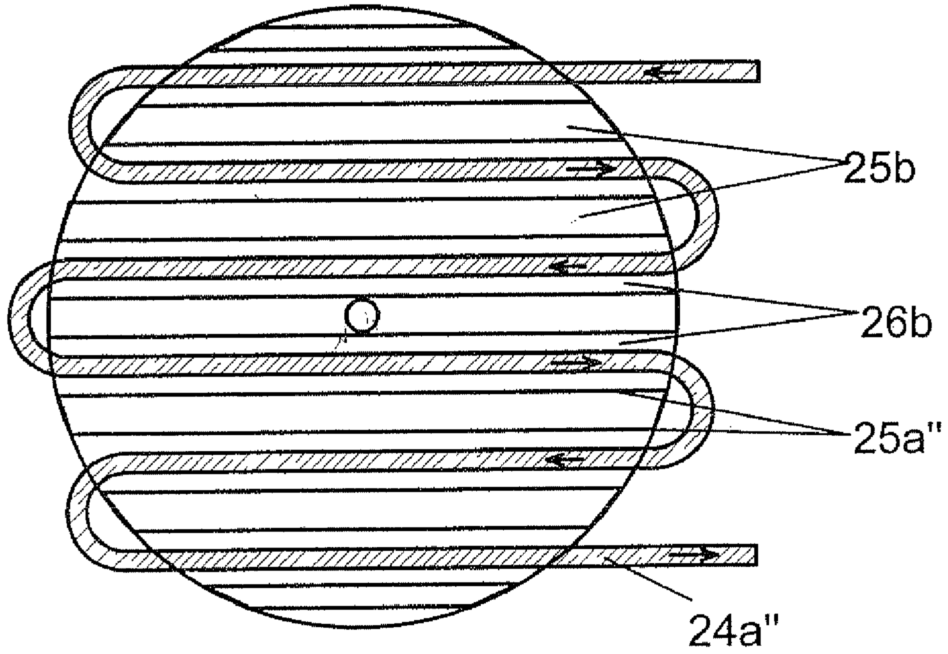
FIG. 5 shows a schematic plan view of a soft-magnet yoke arrangement and of a solenoid arrangement, according to a second embodiment of the invention.

Alternatively, it is also possible for the solenoid arrangement to be realized in the configuration shown in FIG. 5, in which one (or more) winding(s) is (are) inserted in the form of a meander into the recesses 26*a*, 26*b* between the pole webs 25*a*, 25*b* of the magnet yoke arrangement. Here, likewise, respectively oppositely directed electric current is taken past opposing flanks 25*a*', 25*a*" of each of the pole webs 25*a*, 25*b*. In the case of all embodiments, it is evident that the pole webs 25*a*, 25*b* (and also the recesses 26*a* 26) are of a shape which is substantially asymmetrical in relation to the central longitudinal axis M of the fuel injection valve, at least one solenoid arrangement 24*a*', 24*a*" at least partly enclosing pole webs of non-circular shape in such a way that oppositely directed electric current is taken past the flanks of said pole webs.

The embodiment of a solenoid arrangement 24*a* shown in FIGS. 6 and 7 is produced in an integrated manner with the magnetically soft magnet yoke arrangement 24*b* which cooperates therewith. For this purpose, an elongated yoke plate 50 containing soft iron is surrounded on both sides by a conductor strip 52, in that the latter is bent around a longitudinal edge 50'—which in the subsequent, finished state is on the inside—of the yoke plate 50. Disposed next to the conductor strip 52 is a plate band 54 which contains soft iron, is just as thick as the conductor strip 52 and is likewise bent around the longitudinal edge 50'—which in the finished state is on the inside—of the yoke plate 50. The plate band 54 next to the conductor strip 52, together with the portion of the yoke plate 50 on which it bears flatly, serves—in the finished state —to constitute the back of the magnet yoke. The conductor strip 52 projects beyond the lateral longitudinal edge 50"—which in the finished state is on the outside—of the yoke plate 50 at both ends, for the purpose of electrical contacting. A second layer of an elongated yoke plate 56 containing a soft iron is then is then laid against said conductor strip, so as to produce a layer structure consisting of the first yoke plate 50, the conductor strip 52 and the plate band 54, and the second yoke plate 56. This layer structure is then rolled together in the form of a spiral, in the manner shown in FIG. 6, in order to obtain the overall structure consisting of a coil and a yoke. After having been rolled together in the form of a spiral, the first and second yoke plates 50, 56 lie close to one another, and the overall structure is a cylindrical winding body. It is understood that the conductor strip 52 is electrically insulated against the soft-iron parts 50, 54, 56.

The air gap, shown in FIG. 1, between the magnet yoke arrangement 24*b* and the magnet armature arrangement 24*c*, said air gap being coaxial in relation to the central longitudinal axis M and being formed when the actuating device 24 is in its neutral position, is approximately 10 times larger than the grid dimension of the pole webs. In the case of this embodiment, the grid dimension is the transverse dimension of the pole webs. In the case of the embodiment of the magnet yoke arrangement 24*b* according to FIGS. 6, 7, the grid dimension is the thickness of the yoke plate 40. Other geometries of the pole webs are also possible. Determinant for the grid dimension are the smallest structures of the pole webs, i.e. their longitudinal dimensions, transverse dimensions, thickness, etc., that result in a small-sized shape of the poles of the magnet yoke which act upon the magnet armature. This small grid dimension results in a high magnetic flux density, and consequently in high attractive or holding forces of the valve arrangement and also in a low switching time, since the electric and magnetic losses, or the induced counterforces, are very small.

Figure 8:
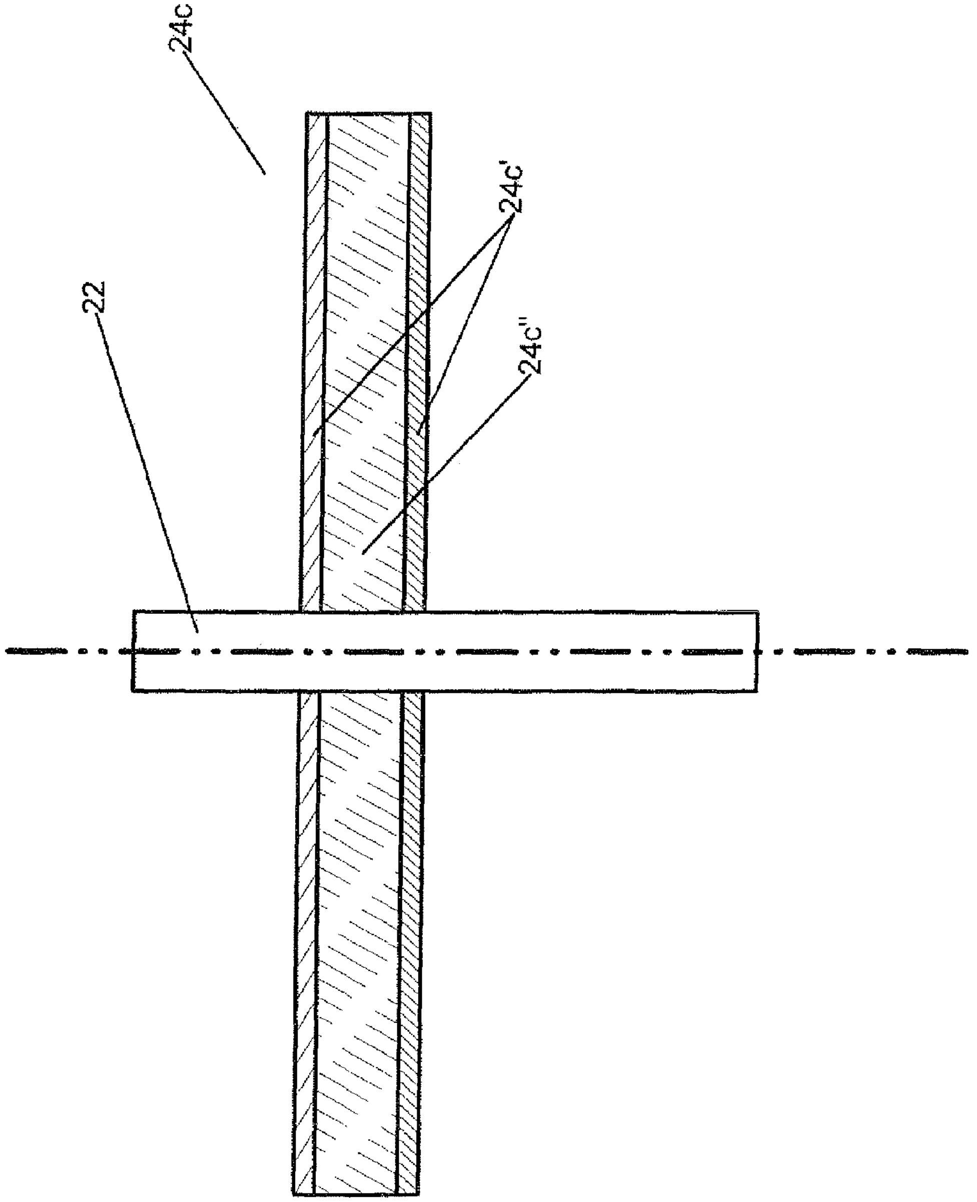
FIG. 8 shows a lateral, partially longitudinal sectional representation of the valve rod, with an armature arrangement which has a box profile.

FIG. 8 shows a further alternative for a development of the armature arrangement. In this case, the armature disc 24*c* is of a multilayer structure. In order to increase the mechanical solidity, a ceramic layer 24*c*" is disposed between two soft-iron layers 24*c*' which are relatively thin—and therefore have a low eddy-current content—and attached to the valve rod 22. It is understood that the two soft-iron layers 24*c*' may be either complete armature discs or discs which have been recessed in the manner described above. A plurality of such armature arrangements may also be distributed along the valve rod 22.

Figure 9:
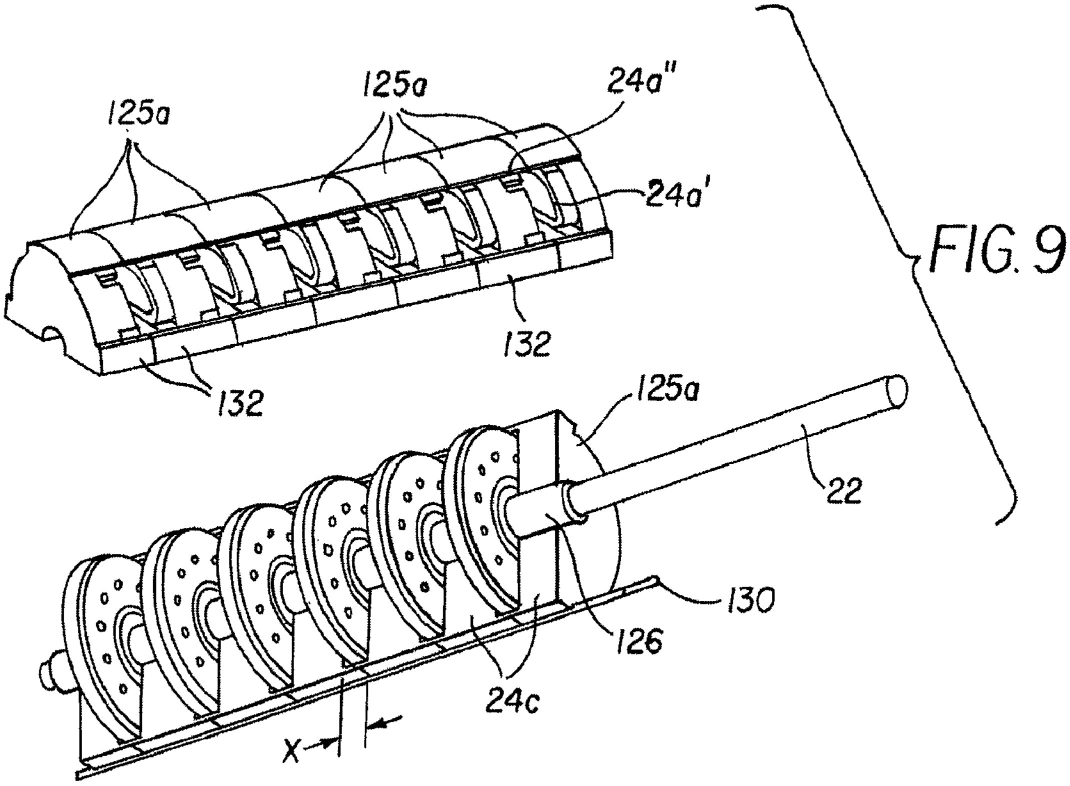
FIG. 9 shows a perspective side view of a further embodiment of an actuating device according to the invention.
Figure 10:
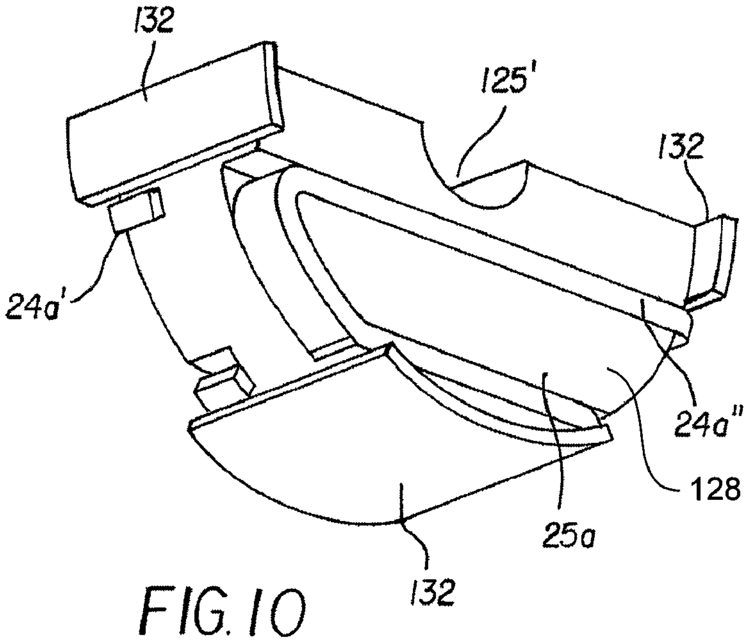
FIG. 10 shows an enlarged, perspective side view of a partial yoke of a yoke disc for an actuating device according to the invention as shown in FIG. 9.

FIG. 9 shows a partial view of a further development of the magnet yoke arrangement 24*b* according to the invention, in which respectively two partial yokes 125*a* of substantially semicircular disc shape are joined together to form a yoke disc 125 of the magnet yoke arrangement 24*b*. In the centre of each yoke disc 125 composed of two partial yokes 125*a* of semicircular disc shape is a semi-cylindrical recess 125' (see FIG. 10), which accommodates a bearing bushing 126 for the valve rod 22. Each yoke disc is thus composed of at least two partial yokes which contain soft iron and surround an actuating rod which supports the magnet armature arrangement. The respective partial yokes of a yoke disc are bonded to each other.

The two faces 128, 130 of each yoke disc 125 of the magnet yoke arrangement—apart from the yoke discs at the two ends of the yoke-disc stack in FIG. 9—have a respective pole web 25*a*, 25*b*, which together with the solenoid arrangement 24*a*', 24*a*" acts upon the magnet armature arrangement 24*c*. In this case the magnet armature arrangement 24*c* is constituted by a corresponding number of soft-iron discs which are welded onto the valve actuating rod 22 and are provided with a multiplicity of bores through which the fuel can flow when the magnet armature arrangement 24*c* moves between its end positions.

In the region of its outer circumferential surface, each partial yoke 125*a* has an integrally formed spacer 130 which concomitantly determines the dimension X of the cavity 28 between the two yoke discs 125, In addition, electrical connecting pieces 132 for the solenoid arrangement 24*a*', 24*a*" are disposed in the region of the outer circumferential surface of the yoke disc 125. Solenoid arrangements 24*a*', 24*a*" facing respectively the same side of the magnet armature arrangements 24*c* are thus connected for co-phasal electrical activation in series or parallel connection.

The magnet armature arrangements 24*c* disposed on the actuating rod 22 thus constitute a sub-assembly, which is to be assembled with the two further sub-assemblies constituted by stacked partial yokes that are held apart.

A pressure-proof housing surrounds the actuating device 24 and the valve arrangement 20, electrical connections being routed outwards from said housing, by means is of glass bushings, from the electrical connecting pieces 132 for the solenoid arrangements 24*a*', 24*a*".

The solenoid arrangements 24*a*', 24*a*" are realized as copper-containing preforms which are electrically insulated by means of aluminium oxide coating or the like. These preforms are mounted around the pole webs 25*a*, 25*b* and, following joining together of the sub-assembly constituted by individual stacked partial yokes that are held apart, are connected to the electrical connections Finally, the solenoid arrangements 24*a*', 24*a*" are embedded in the recesses of the partial yokes.

The invention claimed is:

1. A fuel injection valve configured for injecting fuel into a combustion chamber of an internal combustion engine, said fuel injection valve comprising a fuel inlet configured to allow fuel to flow into the fuel injection valve, an actuating device configured to be electrically activated and to cooperate via a fuel outlet, the actuating device having a plurality of solenoid arrangements which are configured to be energized, a substantially magnetically soft magnet yoke arrangement which cooperates therewith, and a substantially magnetically soft magnet armature arrangement which cooperates therewith, wherein the magnet yoke arrangement comprises at least two yoke discs adapted to be arranged along an axis of an actuating rod, wherein the at least two yoke discs are separated by at least one spacer which determines a dimension of a cavity between the at least two yoke discs along the axis of the actuating rod, wherein at least one side faces of each yoke disc arranged substantially in a plane that is perpendicular to the axis of the actuating rod and has at least one pole web disposed thereon which, together with the solenoid arrangement, is configured to acts upon the magnet armature arrangement, and wherein each yoke disc comprises at least two partial yokes which contain soft iron and at least partly surround the actuating rod, wherein the actuating rod supports the magnet armature arrangement.

2. Fuel injection valve according to claim 1, wherein each partial yoke cooperates with at least one spacer which determines a dimension of a cavity (28) between two yoke discs.

3. Fuel injection valve according to claim 1 wherein the at least one spacer is disposed in the region of an outer circumferential surface of the yoke disc.

4. Fuel injection valve according to claim 1 wherein the electrical connecting pieces for the solenoid arrangement are disposed in the region of an outer circumferential surface of the yoke disc.

5. Fuel injection valve according to claim 4, characterized in that wherein the solenoid arrangements disposed on partial yoke discs which are arranged so as to be disposed on a first same side of the magnet armature arrangements are connected for co-phasal electrical activation in series or parallel connection.

6. Fuel injection valve according to claim 1 wherein the pole webs have a shape which is substantially asymmetrical in relation to the axis of actuating rod.

7. Fuel injection valve according claim 1 wherein the pole webs are of a substantially polygonal, preferably quadrangular shape, and are disposed next to one another so as to form inter-mediate spaces for accommodating the solenoid arrangements, the pole webs disposed in parallel to one another.

8. Fuel injection valve according to wherein each partial yoke is made of a cobalt-iron-containing material, and wherein the solenoid arrangement is disposed on the at least one side face of each yoke disc, and the and has at least one respective pole web is at least partly surrounded by the at least one solenoid arrangement.

9. Fuel injection valve according to claim 1, wherein the at least one pole web has a non-circular shape.

10. Fuel injection valve according to claim 1 wherein the actuating device comprises a plurality of assemblies, each assembly being separated by at least one spacer, wherein each assembly comprises the magnet yoke arrangement having the solenoid arrangement and the pole web disposed thereon, and the magnet armature arrangement wherein these plurality of assemblies are configured to acting jointly upon the valve arrangement in the same or opposite directions.

11. Fuel injection valve according to claim 1 wherein the actuating device acts upon a movable valve element of the valve arrangement to move said valve element between an open position and a closed position, in relation to a stationary valve seat which cooperates with the valve element, wherein the actuating device is disposed downstream from the fuel inlet.

12. Fuel injection valve according to claim 1 wherein the magnetically soft magnet yoke arrangement has at least two conjoined shell parts with recesses in which there is accommodated a respective solenoid arrangement which ends substantially flush with the respective end face of one of the shell parts, the end faces together delimiting the cavity in which the magnet armature arrangement is accommodated so as to be movable along the central longitudinal axis.

13. Fuel injection valve according to claim 1 wherein the solenoid arrangement is constituted, on at least one side of the magnetically soft magnet armature arrangement, by a plurality of solenoid arrangements which end substantially flush with one of the end faces of one of the shell halves.

14. Fuel injection valve according to claim 13 wherein the individual coils are of a thickness of approximately 20 to approximately 80% of the magnet-yoke iron present between two coils.

15. Fuel injection valve according to claim 1, wherein the solenoid arrangements which are arranged on the first side of the magnet armature are configured to be energized in a first direction, and wherein the solenoid arrangements which are arranged on a second side of the magnet armature which is opposite to the first side are configured to be energized in a second direction which is opposite to the first direction.

16. Fuel injection valve according to claim 1 wherein the magnet armature arrangement is designed as a magnetically soft disc with recesses, preferably radially oriented slots or round or oblong holes extending to the edge of the disc.

17. Fuel injection valve according to claim 1, wherein the magnet armature arrangement has a multilayer structure comprising, a ceramic layer disposed between two soft-iron layers, wherein the magnet armature arrangement is attached to the actuating rod.

18. Fuel injection valve according to wherein the magnet armature arrangement and the valve element are connected to each other via the actuating rod, are biased to the open position or the closed position by a spring arrangement, and can be brought into the closed position or the open position solenoid arrangement.

19. Fuel injection valve according to claim 1, wherein the magnet armature arrangements are welded onto the actuating rod.

20. Fuel injection valve according to wherein the magnet armature arrangements disposed on the actuating rod constitute a first sub-assembly which is to be assembled with at least one further second sub-assembly which comprises a plurality of stacked partial yokes that are held apart by the at least one spacer.

21. Fuel injection valve according to claim 1, wherein pressure-proof housing surrounds the actuating device and the valve arrangement, and wherein the electrical connecting pieces route electrical connections for the at least one solenoid arrangmentd outwards from said housing.

22. Fuel injection valve according to wherein the solenoid arrangements are copper-containing pre-forms comprising ceramic coating, aluminium oxide coating, electrophoretic paint coating or the like for electrical insulation; wherein said pre-forms are mounted around the pole webs, wherein sub-assembly is constituted by individual stacked partial yokes that are held apart by the at least one spacer and are joined together, and said pre-forms are connected to the electrical connecting pieces.

23. Fuel injection valve according to claim 1, wherein the solenoid arrangements are embedded in or bonded to the partial yoke discs.

24. Fuel injection valve arrangement according to claim 1, wherein the fuel injection valve is configured to project into the combustion chamber of an externally ignited internal combustion engine.

25. Fuel injection valve according to claim 1, wherein the fuel injection configured to project into the combustion chamber of a self-igniting internal combustion engine.

26. The fuel injection valve according to claim 1, further comprising an assembly block which has a number of receptacles which corresponds to the number of yoke discs of the fuel injection valve, said receptacles being axially spaced apart and so dimensioned that the yoke parts of the yoke discs can be inserted and removed in a substantially play-free manner, the axial spacings of the recesses corresponding substantially to the axial extent of the cavity between two adjacent yoke discs and said assembly block being configured for allowing the spacers to be welded, soldered or bonded to the yoke parts.

* * * * *